United States Patent
Matheny et al.

(10) Patent No.: US 7,473,475 B1
(45) Date of Patent: Jan. 6, 2009

(54) BLIND WELD CONFIGURATION FOR A ROTOR DISC ASSEMBLY

(75) Inventors: Alfred Paul Matheny, Jupiter, FL (US); Bradley S Carter, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 487 days.

(21) Appl. No.: 11/282,405

(22) Filed: Nov. 18, 2005

Related U.S. Application Data

(60) Provisional application No. 60/680,576, filed on May 13, 2005.

(51) Int. Cl.
*B32B 1/04* (2006.01)
*B23K 28/00* (2006.01)

(52) U.S. Cl. .................. 428/598; 428/599; 428/600; 29/889; 228/171; 228/182

(58) Field of Classification Search .................. None
See application file for complete search history.

(56) References Cited

U.S. PATENT DOCUMENTS

| | | | |
|---|---|---|---|
| 1,841,779 A * | 1/1932 | Becker ................. 405/279 |
| 2,045,291 A * | 6/1936 | Busse ................. 105/378 |
| 2,093,208 A * | 9/1937 | Nolte ................. 29/897.3 |
| 2,200,287 A | 5/1940 | Lysholm |
| 2,288,433 A | 6/1942 | Boetcher et al. |
| 2,317,092 A | 4/1943 | Allen |
| 2,440,933 A | 5/1948 | Cunningham, Jr. |
| 2,450,493 A | 10/1948 | Strub |
| 2,492,833 A * | 12/1949 | Baumann ................. 415/198.1 |
| 2,555,924 A | 6/1951 | Faber |
| 2,619,317 A | 11/1952 | Traupel |
| 2,637,521 A | 5/1953 | Constantine et al. |
| 2,918,977 A * | 12/1959 | Fedan et al. ................. 416/233 |
| 3,067,490 A | 12/1962 | Luthy et al. |
| 3,172,508 A * | 3/1965 | Doering et al. ................. 52/579 |
| 3,182,763 A * | 5/1965 | Glaser ................. 52/579 |
| 3,617,150 A | 11/1971 | Wagle |
| 3,828,563 A * | 8/1974 | Saucke ................. 405/279 |
| 3,876,335 A | 4/1975 | Forcinal et al. |
| 4,017,212 A | 4/1977 | Gordienne et al. |
| 4,060,883 A | 12/1977 | Coulon et al. |
| 4,063,062 A * | 12/1977 | Kuhnen ................. 219/121.14 |
| 4,581,816 A | 4/1986 | Klufas et al. |
| 4,743,165 A | 5/1988 | Ulrich |
| 5,639,209 A | 6/1997 | Pollini et al. |
| 5,881,508 A * | 3/1999 | Irvine et al. ................. 52/177 |
| 6,152,697 A | 11/2000 | Konishi et al. |

(Continued)

*Primary Examiner*—John J Zimmerman
(74) *Attorney, Agent, or Firm*—John Ryznic

(57) ABSTRACT

A welded joint between two metal members in which the weld must support a structural load. The abutting faces of the welded members have step portions formed therein, in which the step portions extend beyond the surface of the adjoining welded members. The outer step portion of one member extends beyond an inner step portion of the adjacent member, and a weld is applied on abutting faces of the members and the step portions. The welded joint of this invention is intended to be used for two adjacent rotor discs in a gas turbine engine. But, the weld arrangement of this invention can be used for welding two pipes together, or two adjacent plate members. The weld arrangement of this invention provides for reduced stress distribution along the weld line that acts to increase part life.

16 Claims, 3 Drawing Sheets

U.S. PATENT DOCUMENTS

| | | | |
|---|---|---|---|
| 2002/0092165 A1* | 7/2002 | Endres | 29/889.2 |
| 2003/0124376 A1* | 7/2003 | Ezumi et al. | 428/544 |
| 2003/0230625 A1* | 12/2003 | Aota et al. | 228/112.1 |
| 2007/0119830 A1* | 5/2007 | Meier | 219/121.64 |

* cited by examiner

BLIND WELD CONFIGURATION FOR A ROTOR DISC ASSEMBLY

CROSS-REFERENCE TO RELATED APPLICATIONS

This application claims the benefit to a co-pending U.S. Provisional application 60/680,576 filed May 13, 2005 entitled Blind Weld Configuration for Rotor Disc Assembly.

BACKGROUND OF THE INVENTION

1. Field of the Invention

The present invention relates to a weld configuration for adjacent cylindrical pipe members such as rotor discs in a gas turbine engine, and a method of heating one of the tubes or discs prior to joining to provide a tight fit to hold the discs together for welding.

2. Description of the Related Art Including Information Disclosed Under 37 CFR 1.97 and 1.98

In a gas turbine engine, a series of rotor discs are joined together to form a rotor assembly. Adjacent discs are generally bolted or welded together, or both. Prior art welds between adjacent rotor discs allow for high stresses to act along the weld joints. One early method for welding rotor discs is shown in the U.S. Pat. No. 3,067,490 issued to Luthy et al on Dec. 11, 1962. This invention shows two rotor discs welded together along an overlapping cylindrical lip. This joint configuration still allows for high stress loads along the weld joint.

U.S. Pat. No. 2,555,924 issued to Faber on Jun. 5, 1951 shows a Fluid Cooled Rotor Structure in which rotor discs are welded together along an interface, the interface having coordinating step portion formed within the discs. This weld, like the previous Luthy weld, still does not provide the reduction in stress loads at the weld as does the present invention.

U.S. Pat. No. 2,200,287 issued to Lysholm on May 14, 1940 shows a Turbine with rotor discs welded along step portions of the disc similar to the Luthy and Faber patents described above. The Lysholm rotor disc weld also lacks the stress reduction of the present invention.

It is an object of the present invention to provide for an improved weld joint in a weld between joined members in which the weld interface carries a structural load of the two members.

It is another object of the present invention to provide for an improved weld between two pipe members.

It is another object of the present invention to improve the service like of a rotor disc assembly in a gas turbine engine.

It is also an object of the present invention to provide a weld structure for tube or pipe assembly like that in rotor discs in a gas turbine engine that provides for reduced stress concentrations that would result across the welds. These objects of the invention and how they are accomplished are described below in the detailed description of the present invention.

BRIEF SUMMARY OF THE INVENTION

The present invention provides for a welded joint configuration between adjacent members such as pipe or rotor discs, the joint having a shape of two steps extending above a plain surface of the prior art. The members, pipes or discs are joined together by a weld applied along the adjoining sections. The stepped portions provide for reduced stress concentrations along the weld. The intended use of the present weld configuration is for rotor discs in a gas turbine engine. However, the welded joint configuration could be used for pipe or flat plate joints.

An additional feature of the present invention is a method of preheating one of the adjacent discs such that the heated disc thermally expands in a radial direction. The cold disc includes a groove portion at the joint, while the heated disc includes a tongue that fits within the groove. The heated disc is positioned against the cold disc, and when cooled the joint creates a tight bind to hold the two discs in place for welding.

DETAILED DESCRIPTION OF THE INVENTION

Figure 1:
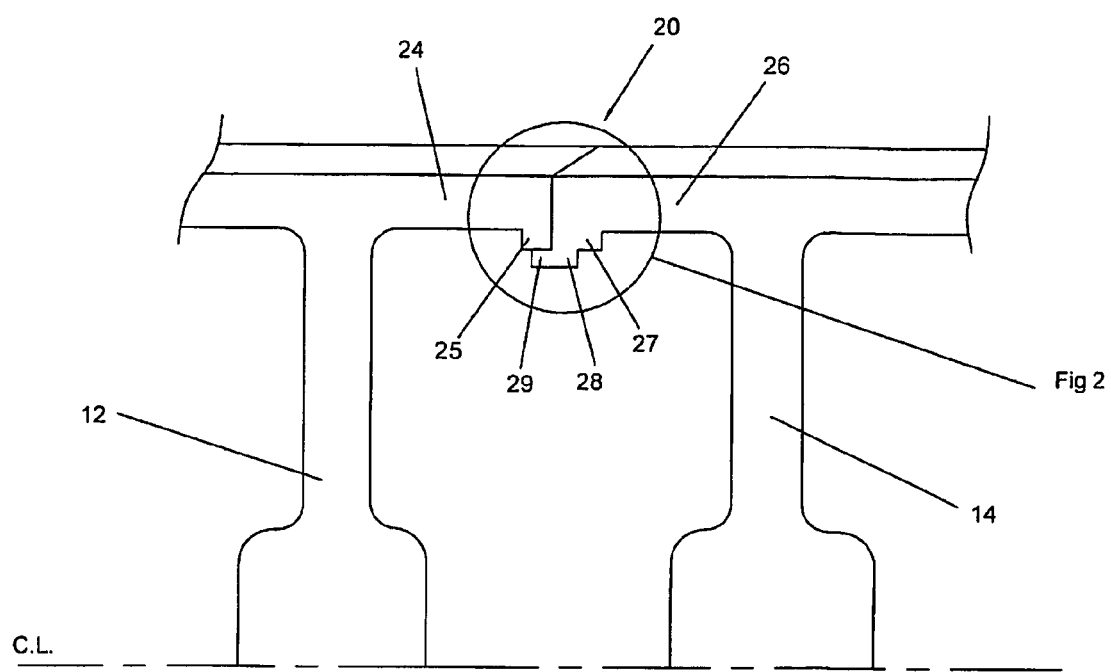
FIG. 1 shows a rotor for a gas turbine engine formed from two adjacent rotor discs that are joined together along a weld line.

The present invention is a weld configuration between two rotor discs of a gas turbine engine. FIG. 1 show a first rotor disc 12 joined to a second rotor disc 14 along a weld configuration 20 that makes up the present invention. First disc 12 includes a first extending member 24, and second disc 14 includes a second extending member 26, the two members 24 and 26 abutting along lines in which the weld is formed. The first extending member 24 includes a first step portion 25. The end face of the first extending member 24 and the end face of the first step portion 25 are flush along the weld line. The second extending member 26 includes a first step portion 27 and a second step portion 28. The end face of the second extension member 26 and the first step portion 27 are flush with the weld line. The second step portion 28 of the second extending member 26 includes a flange portion 29 that extends beyond the weld line to overlap the first step portion 25 of the first extending member 24. When the two members are abutted together along the weld line, the step portions formed about the weld line are symmetric about the weld line. Each of these two extending members 24 and 26 has a clearly defined radial outer-most surface and a radial inner-most surface which would be the top of the extending portion and the bottom of the extending portion. The feature of the present invention is in the shape of the two step portion formed where the first and second extending members 24 and 26 meet.

Figure 2:
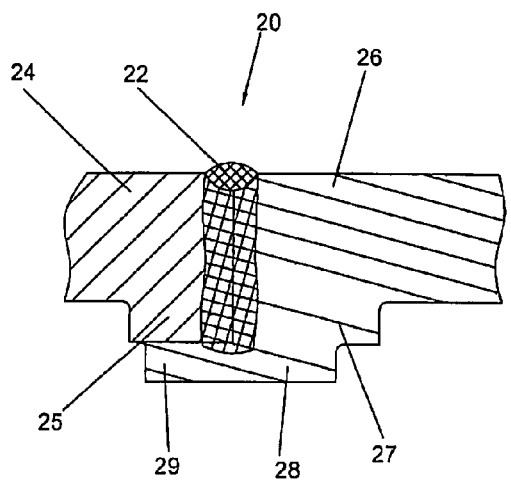
FIG. 2 shows a close-up of the weld joints of adjacent discs before the weld is cleaned.
Figure 3:
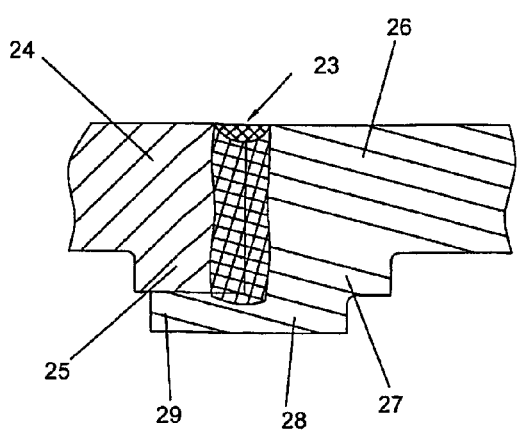
FIG. 3 shows the weld joints after the weld is ground to produce a smooth surface flush with the disc surfaces.

The weld configuration 20 of the present invention is best shown in FIGS. 2 and 3. FIG. 2 shows the weld configuration after the weld 22 has been applied. FIG. 3 shows the weld configuration after the weld surface 23 has been ground to form a smooth surface with the adjoining surfaces of the extending members 24 and 26. The first extending member 24 includes a single step portion extending toward the centerline CL of the rotor assembly. The second extending member 26 includes a double step portion also extending toward the centerline CL of the rotor assembly. In the present invention, the steps are shown to extend inward toward the centerline of the rotor disc assembly. However, the inventive design of the weld assembly could be arranged such that the steps would extend in a radial outward direction. It is preferred that the steps extend inward in order to provide for a smooth surface on the outward facing sections of the rotor discs. The space inward between the adjacent discs is not used for anything and is therefore the most likely direction to place the steps. When placed together, the two extending members 24 and 26 form the weld configuration 20 of the present invention. The inventors of the present invention have discovered—by computer stress modeling—that this two step configuration in the adjoining sections at the weld provides for a greatly reduced concentration of stress at the weld.

Figure 8:
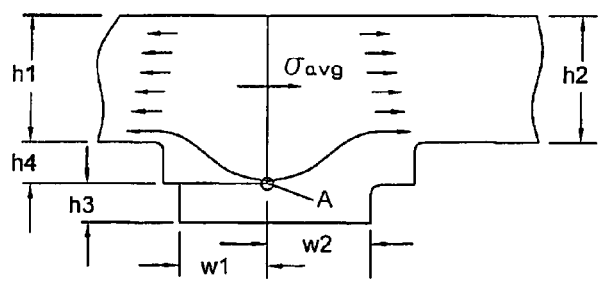
FIG. 8 shows a cross section view of the weld joint with stress concentrations shown.

The dimensions of the step portions of the weld abutment is shown and described with respect to FIG. 8. The step portions that form the welded abutment are dimensioned as w1, w2, and h1 through h4. A point A represents the corner edge on which rotor 24 abuts a corner edge of rotor 26. Dimensions h1-h4 is based on the thicknesses h1 and h2 of the rotors 24 and 26. the dimensions of w1, w2, h3, and h4 are such that the average stress $\sigma_{avg}$ is greater than or equal to the stress at point A times a stress concentration factor ($\sigma_{avg} \geq ((\sigma_A \times K_t))$) in which $K_t$ is 3.0.

Figure 4:
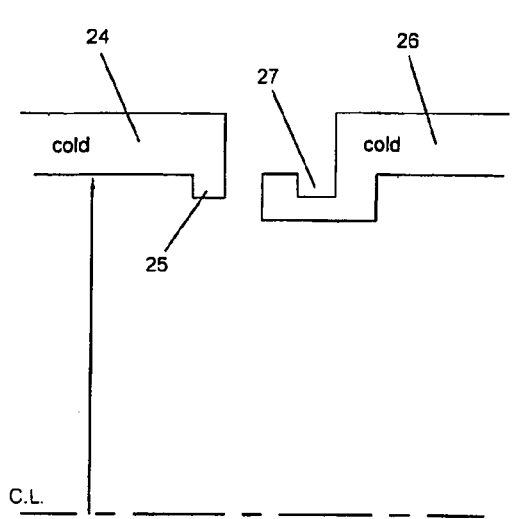
FIG. 4 shows adjacent rotor discs prior to heating of one and joining together.
Figure 5:
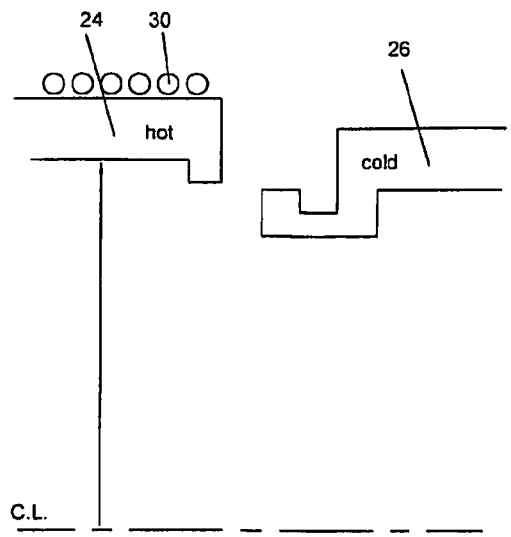
FIG. 5 shows heating of one of the discs in order that the disc thermally expands in a radial direction.
Figure 6:
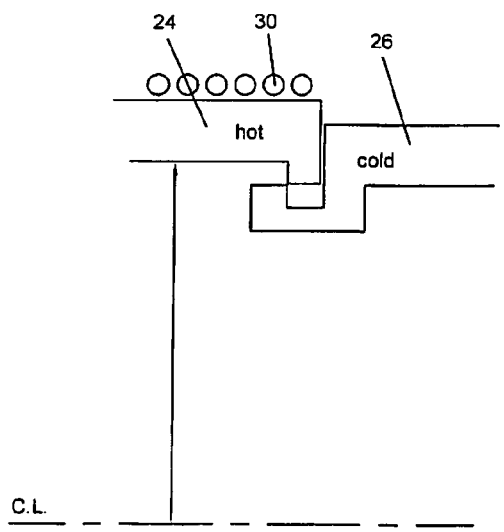
FIG. 6 shows a tongue of the heated disc aligned with a groove of the cold disc prior to cooling of the heated disc.
Figure 7:
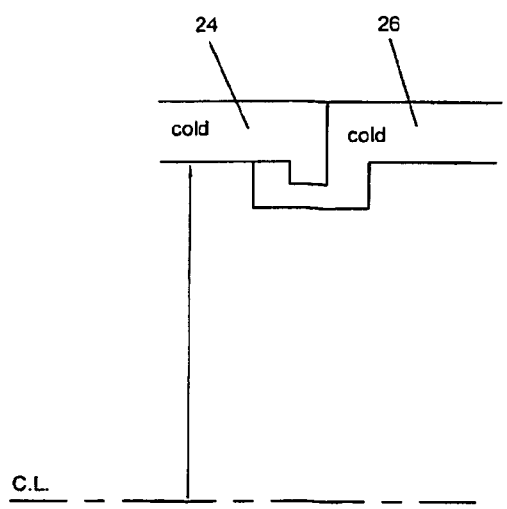
FIG. 7 shows the tongue of the heated disc cooled and tightly fitted within the groove of the cold disc.

Another feature of the present invention is represented in FIGS. 4 through 7, in which one of the rotor discs is heated to produce a thermal expansion in the radial direction. One of the discs includes a tongue member 25 that will engage a groove portion 27 of the other disc. FIG. 4 shows the two rotor discs in the cold condition with the relative radial spacing from the common centerline CL. The first extending member 24 of the first disc is heated by a heating element 30 to produce a radial thermal expansion such that an inner surface of the tongue 25 has a radial distance from the centerline greater than a top of the groove 27 in the second extending member 26 of the second disc. The two extending members 24 and 26 are brought together in FIG. 6 while the one portion is still hot. When the tongue 25 is aligned with the groove 27, the heated disc is allowed to cool such that the thermal expansion is eliminated and the tongue fits tightly within the groove. The purpose for this procedure is to create a tight fit between the tongue and groove members so that the two discs do not move relative during the welding process.

In the present invention, the type of weld can be any of the well-known methods of welding two metals together. It is not the actual weld material that makes up the present invention, but the use of the two step shaped portion where the weld is formed. Also, use of the tongue and groove in the adjoining pieces along with heating of one of the pieces to produce a thermal growth is another feature of the present invention. FIGS. 2 and 3 show the weld applied along only a portion of the adjoining surfaces. In the actual rotor disc assembly, the weld is applied along the full circumference of the adjoining surfaces, and the weld is then ground to produce a smooth surface with the surrounding surfaces.

We claim the following:

1. A welded joint, comprising:

A first member having a first step portion, an abutting face of the first member and the first step portion being substantially flush;

A second member having a first step portion and a second step portion, an abutting face of the second member and the first step portion of the second member being substantially flush, the second step portion of the second member having a flange portion extending beyond the abutting face of the second member;

The flange portion of the second member extending over the first step portion of the first member to form a second step portion on the first member; and, A weld applied along abutting faces of the two members and the step portions.

2. The welded joint of claim 1, and further comprising:

The first and the second step portions having substantially the same thickness.

3. The welded joint of claim 1, and further comprising:

The first and the second step portions each have a thickness at least 15% of the thickness of each of the two members.

4. The welded joint of claim 1, and further comprising:

The width of the second step portion is equal to about one half of the combined width of both first step portions.

5. The welded joint of claim 1, and further comprising:

The first and second step portions form a symmetric step arrangement about the weld line.

6. The welded joint of claim 1, and further comprising:

The first and second members are two pipes, and the step portions are directed inward of the pipes.

7. The welded joint of claim 1, and further comprising:

The first and second members are rotor discs of a gas turbine engine, and the step portions are directed inward of the rotor discs.

8. A process for welding two members together, the process comprising the steps of:

Providing for a first member having a first step portion, the abutting faces of the first member and the first step portion being flush;

Providing for a second member having a first step portion, the abutting faces of the second member and the first step portion of the second member being flush;

Providing for the second member to have a second step portion extending beyond the abutting face of the second member to form a second step portion for the first member;

Welding the abutting faces of the members and the step portions along a weld line.

9. The process for welding two members together of claim 8, and further comprising the step of:

Providing for the first and the second step portions to have substantially the same thickness.

10. The process for welding two members together of claim 8, and further comprising the step of:

Providing for the first and the second step portions to each have a thickness at least 15% of the thickness of each of the two members.

11. The process for welding two members together of claim 8, and further comprising the step of:

Providing for the width of the second step portion to be equal to about one half of the combined width of both first step portions.

12. The process for welding two members together of claim 8, and further comprising the step of:

Providing for the first and second step portions to form a symmetric step arrangement about the weld line.

13. The process for welding two members together of claim 8, and further comprising the step of:

Providing for the first and second members to be two pipes in which the step portions are directed inward of the pipes.

14. The process for welding two members together of claim 8, and further comprising the step of:

Providing for the first and second members to be rotor discs of a gas turbine engine in which the step portions are directed inward of the rotor discs.

15. The welded joint of claim 1, and further comprising:

The first and second members and the step portions are made of metallic materials that can accommodate a welding process.

16. The welded joint of claim 1, and further comprising:

The first step portion of the first member are cast or machined together; and,

The first and second step portions of the second member are cast or machined together.

* * * * *